United States Patent Office 3,518,246
Patented June 30, 1970

3,518,246
MONOAZO PYRIMIDYL CONTAINING DYES
Guenther Auerbach, Basel, Jakob Benz, Oberwil, Basel-Land, and Walter Wehrli, Riehen, Switzerland, assignors to Sandoz Ltd. (also known as Sandoz A.G.), Basel, Switzerland
No Drawing. Filed Mar. 9, 1966, Ser. No. 532,872
Claims priority, application Switzerland, Mar. 11, 1965, 3,423/65
Int. Cl. C09b 62/22, 62/24, 62/26
U.S. Cl. 260—154                5 Claims

ABSTRACT OF THE DISCLOSURE

Organic water-soluble dyes having in their molecular structure at least one 2,4-dihalopyrimidylacetyl group (which may be methyl-substituted in the 6-position) bound in the 5-position through an amino group (which may be monosubstituted) produce dyeings which have good fastness to light, washing, milling, perspiration, water and rubbing.

---

This invention relates to water-soluble reactive dyes containing at least one radical of formula

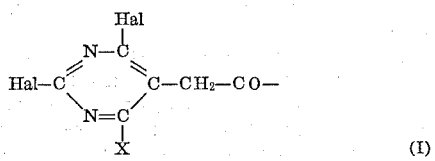

(I)

where Hal represents chlorine or bromine and X, hydrogen or methyl, this radical being bound through an imino group which may be monosubstituted.

The process for the production of these new dyes consists of reacting water-soluble organic dyes, or organic compounds capable of dye formation, which contain at least one amino group (which may be monosubstituted) with at least 1 mol of an acid halide of formula

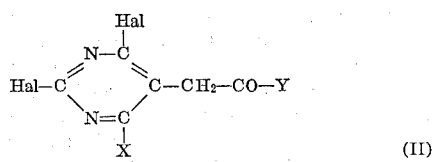

(II)

where Hal and X have the aforestated meanings and Y represents chlorine or bromine, after which the resulting reaction products, when they are capable of dye formation, are converted into water-soluble dyes.

The new process is applicable with all types of water-soluble dyes. The amino group (which may be monosubstituted if desired) is understood to be an amino group whose substituent, when present, is an alkyl, hydroxyalkyl, alkoxyalkyl or halogenalkyl radical, in which case the alkyl group contains, preferably, 1 to 5 carbon atoms. Thus, any organic dye containing at least one, but generally not more than two amino groups, may be considered for use in the process; in these the amino group may be bound directly to an aromatic nucleus of the dye molecule, e.g. in azo dyes in the diazo component, in the coupling component or in the case of disazo dyes, also in the central component, or indirectly to the dye molecule through an aliphatic chain and, in certain instances, a bridge member.

The following may be mentioned as exampes of aliphatic chains:

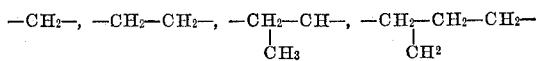

and

—CH₂—CH₂—CH₂—CH₂—

Examples of suitable bridge members are:

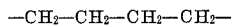
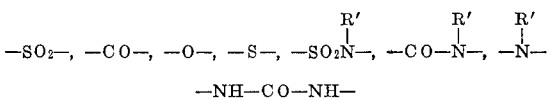
—NH—CO—NH— wherein R' may stand for hydrogen, low molecular alkyl or hydroxyalkyl, cycloalkyl, aryl or aralkyl, or for

in which case R" stands for an acyl radical.

Notable examples of this type of dye are aminomonoazo, aminopolyazo, aminostyryl, aminonitro, aminohydroxyquinophthalone, aminoformazane, aminoanthraquinone and aminophthalocyanine dyes. The aminomonoazo, aminopolyzo and aminoformazane dyes may contain metal atoms in a coordinative bond, for example atoms of chromium, cobalt, nickel or copper. Aminoazo dyes bearing metallizable groupings also can be reacted with a compound of Formula II. Dyes of this type can be metallized in substance after condensation or they can first be caused to react with the fiber in the unmetallized state by one of the normal methods and the resulting dyeing aftertreated with a metal-yielding agent. Metal-free phthalocyanine itself or a metal-containing phthalocyanine can be used, for example cobalt, nickel or copper phthalocyanine. The amino group may be bound directly to a benzene nucleus of the phthalocyanine molecule or indirectly through a —CH₂— group or through a sulfonic acid arylamide group, for example a sulfonic acid phenylamide group, or through a sulfonic acid alkylamide group, for example a sulfonic acid ethylamide or propylamide group. Besides the reactive group conforming to the invention, the dyes may bear other groups imparting specific properties, for example basic groups or preferably quaternary ammonium groups.

As stated in the definition, it is possible to arrive at dyes containing a reactive group of Formula I by starting from organic compounds which are capable of dye formation and contain at least one amino group which may be monosubstituted. Azo coupling and condensation reactions are of special interest for converting the reaction products into the final dyes. One suitable procedure is to react a compound containing at least one readily acylizable amino group, unsubstituted or monosubstituted as desired, plus one poorly acylizable, but diazotizable, amino group with a compound of Formula II, and to diazotize the intermediate and couple the diazo compound with a coupling component to give a water-soluble dye. When diamines are used containing two identical reactive amino groups, e.g. 1,3- or 1,4-diaminobenzene, it is best to work in a reaction medium in which the diamine is readily soluble, while the monocondensation product is poorly soluble to insoluble; so it is precipitated immediately upon formation and is not available for further acylation. Example of suitable coupling components are phenolic hydroxy compounds, such as monohydroxybenzenes, dihydroxybenzenes, monohydroxynaphthalenes and dihydroxynaphthalenes which may bear further substitutents, for example amino, acylamino (acetylamino), alkyl (methyl or ethyl) or alkoxy (methoxy or ethoxy) groups or halogen (chlorine, bromine) atoms and, in the case of naphthalene derivatives, in particular sulfonic acid groups; enolic hydroxy compounds such as pyrazolones, acylacetylamino derivatives, preferably 1-aryl-3-methyl-5-pyrazolones or 1-aryl-3-carboxy-5-pyrazolones, acetoacetylaminobenzenes, benzoylacetylaminobenzenes, acetoacetylaminonaphthalenes and benzoylacetylaminonaphthalenes which may contain substituents such as halogen atoms, alkyl, alkoxy or preferably sulfonic acid groups; barbituric acid compounds which are capable of reacting twice with diazonium salts with the formation of formazane dyes, such as cyclohexanone, levulinic acid, malonic acid derivatives, cyanoacetic acid, acetylmethylsulfonylbenzenes, carboxymethylsulfonylbenzenes, acetylmethylsulfonylnaphthalenes and carboxymethylsulfonylnaphthalene and their sulfonic acids; amino compounds such as aminobenzenes coupling in para position to the amino group, preferably substituted or unsubstituted N,N-dialkylaminobenzenes, aminonaphthalenes which couple in ortho position to the amino group and may be monoalkylated or monoarylated and further substituted, for example by hydroxyl groups and/or sulfonic acid groups; and 5-aminopyrazoles. Furthermore, a compound of Formula II can be condensed with compounds bearing at least one unsubstituted or monosubstituted amino group and a carbon atom capable of coupling, to yield an intermediate for use as coupling component. Examples of compounds suitable for this reaction are aminohydroxy compounds (aminohydroxybenzenes, aminohydroxynaphthalenes and their sulfonic acids), amino-enol compounds (aminoaryl-pyrazolones, amino-acylacetylaminobenzenes, amino-acylacetylnaphthalenes and their sulfonic acids) and compounds which are capable of reacting twice with diazonium salts with the formation of formazane dyes (aminoocyclohexanone, 1 - amino - 3 - carboxymethylsulfonyl - or 1 - amino - 4 - carboxy - methylsulfonyl-benzenes or -naphthalenes, 1-amino-3-acetyl-methylsulfonyl- or 1-amino-4-acetyl-methylsulfonyl-benzenes or -naphthalenes). The diazo compound of diazo component containing a reactive group of Formula I can of course be coupled with a coupling component which likewise contains a reactive group of Formula I.

Examples of organic compounds which can be used for the formation of the water-soluble reactive dyes are 1,3- and 1,4-diaminobenzenes, 1,3 and 1,4-diaminobenzene-sulfonic acids and -carboxylic acids, 4,4'-diamino-1,1-diphenyl-3-sulfonic acid, 1-(3'- or 4'-amino)-phenyl-3-methyl-5-pyrazolones, aminohydroxynaphthalenes or preferably their sulfonic acids, for example 2-amino-5-hydroxynaphthalene-7-sulfonic acid, 2-amino-5-hydroxynaphthalene-1,7-disulfonic acid, 2-amino-8-hydroxynaphthalene-6-sulfonic acid, 2-amino-8-hydroxynaphthalene 3,6-disulfonic acid, 1-amino-8-hydroxynaphthalene-4,6-disulfonic acid or 1-amino-8-hydroxynaphthalene-3,6-disulfonic acid.

The monoacylamino-monoamino compounds obtained by monocondensation of diamines with a compound of Formula II can be converted into dyes by submitting them to a further condensation reaction with, for example, an aldehyde with formation of a Schiff's base or with an acid halide of a dye, preferably a carboxylic acid chloride or sulfonic acid chloride (copper phthalocyaninepolysulfonic acid chloride). Also, ketomethylene compounds such as pyrazolones and acylacetylamino compounds which bear a reactive group of Formula I can be condensed with an aldehyde, preferably an N,N-dialkylaminobenzaldehyde which may be substituted, to yield styryl dyes.

Of the groups of dyes suitable for the process of this invention, the water-soluble dyes described in British patent specification 904,581, pages 2 to 7, where the substituent A (diahalogenopyrimidyl) is to be replaced by a hydrogen atom, merit special consideration.

Further examples of amino dyes into which the reactive radical of Formula I may be inserted are also disclosed generically and specifically in, e.g. U.S. Pats. 2,892,670; 2,892,671 and 2,978,289 and such disclosures as far as they relate to chromophoric compounds or dyes into which the fiber-reactive group of Formula I may be inserted, are incorporated herein by reference thereto.

The reaction of the water-soluble dyes or water-soluble compounds containing an amino group which are used as starting products with a compound of Formla II can be carried out in aqueous or aqueous-organic medium at 0° C. to 50° C. or preferably at 15–30° C. and in the presence of acid-binding agents such as sodium carbonate, sodium hydroxide, barium hydroxide, calcium hydroxide or sodium acetate.

Acylation of the compounds containing an amino group which are used as starting products can be effected in aqueous suspension, in aqueous-organic suspension or solution, or in solution in inert organic solvents.

The reaction in aqueous-organic or aqueous medium can be carried out at a weakly alkaline, neutral to weakly acid reaction, or preferably in the pH region of 7 to 4. The reaction temperature is adjusted to the reactivity of the starting products used. To neutralize the equivalent of hydrogen chloride which is formed, an acid-binding agent, for example sodium acetate, is added to the solution or suspension at the start of the reaction, or alternatively, small portions of sodium or potassium carbonate or bicarbonate in solid, pulverized form or in concentrated aqueous solution are added in the course of the reaction. Other suitable neutralizing agents are aqueous solutions of sodium or potassium hydroxide. The addition of small amounts of a wetting or emulsifying agent to the reaction solution or suspension can accelerate the rate of reaction. When working with a purely organic medium, it is of advantage to include in the reaction mixture as acid-binding agent a tertiary amine, for example dimethyl- or diethyl-aminobenzene, pyridine or a mixture of pyridine bases.

For acylation, the compound of Formula II can be used as it is in concentrated form, but it is better to dissolve or suspend it in two to five times its amount of dioxane, benzene, chlorobenzene, toluene, dimethylbenzene or acetone and to add the solution or suspension dropwise to the solution or suspension of the compound bearing the amino group at, for example, 15° to about 30° C. and in the presence of acid-binding agents.

On termination of the condensation or coupling reaction the solution or suspension is neutralized if desired and the final water-soluble reactive dye is salted out with sodium or potassium chloride or precipitated with acid, on which it is suctioned off, washed and dried.

The water-soluble reactive dyes conforming to the invention, which bear at least one reactive group of Formula I, are suitable for dyeing leather and for dyeing, padding or printing fibers of vegetable and animal origin, regenerated cellulosic fibers, casein, animalized cellulose, synthetic polyamides, acrylonitrile polymerization products and mixtures of these fibers. The dyes which by reason of the presence of a quaternary amino group are soluble in water are especially suitable for dyeing polyacrylonitrile fibers. The dyed material may be submitted to an alkaline aftertreatment at moderate or high temperature if desired, followed by soaping. The dyeings have good fastness to light, washing, milling, perspiration, water and rubbing. The dyeings can be fixed at room temperature, e.g. 25° C., with a strong alkali such as sodium or potassium hydroxide: when 2–5 grams of sodium hydroxide per litre are used, fixation takes from 1 to 2 hours.

Fixation can be effected at higher temperatures, e.g. 80° to 110° C. or preferably, 90° to 103° C., in which case alkali metal carbonates or bicarbonates are sufficient. The dyeings can be fixed in about 15 to 60 minutes at 90° C. in a solution of sodium carbonate, or in about 5 minutes at 90° C. in a solution of only 0.8 gram of sodium hydroxide per liter, or by steaming for 10 minutes at about 102–103° C. in the presence of sodium carbonate or bicarbonate.

The addition of quaternizable amines, for example trimethylamine, triethylenediamine or 1,4-bis-(dimethylamino)-butene-2 or -butine-2, asymmetrical dimethylhydrazine, acetone-N,N-dimethylhydrazone, 2-butanone- N,N-dimethylhydrazone or N-aminopyrrolidine, preferably in stoichiometric amounts, accelerates dye fixation so that the fixing temperature can be lowered, the fixing time shortened and/or the alkalinity or alkaline additions reduced.

The commonly used wetting, levelling, thickening and other textile auxiliary agents can be used for dyeing, padding and printing. The heat treatment is carried out preferably in the presence of agents which bind hydrogen halide.

The dyed material can be washed off with warm water containing a synthetic detergent if necessary and then rinsed and dried. In certain cases treatment with an inorganic or organic base, an alkaline soap or an alkaline detergent can be carried out in one operation.

In the following examples the parts and percentages are by weight and the temperatures in degrees centigrade.

EXAMPLE 1

46.5 parts of the disodium salt of the dye formula

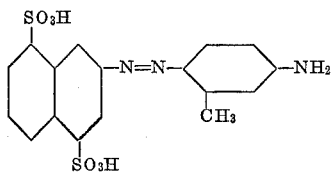

are dissolved in 600 parts of warm water. The neutral solution is cooled to 20° and over about 1 hour a solution of 28.5 parts of 2,4-dichloro-6-methylpyrimidine-5-acetic acid chloride in 50 parts of benzene is added dropwise. During the reaction a sufficient amount of 20% sodium carbonate solution is added to maintain the pH value at 5.5 to 6.5. On completion of acylation the dye is precipitated with sodium chloride, isolated and vacuum dried at 40°, on which it is obtained as a yellow powder which dissolves in water to give yellow solutions. It dyes cotton in yellow shades which have excellent light and wet fastness. In order to impart good storage stability to the dye it is mixed with 10 parts of a phosphate buffer of pH 7 before drying.

Pad dyeing example

A mercerized cotton fabric is padded with a warm neutral solution containing 1.5% of the dye of Example 1 and 1% of sodium 3-nitrobenzene-1-sulfonate, then expressed to retain about 85% of its weight of liquor. It is dried and fixed for about 40 minutes in a bath at 90° containing 300 parts of anhydrous sodium sulfate and 5 parts of sodium carbonate per 1000 parts, the liquor ratio being 1:10 to 1:50. On fixation the fabric is well rinsed with cold water, soaped at the boil, rinsed again and dried. The yellow dyeing has very good light and wet fastness.

In place of sodium carbonate 2.7 parts of 30% sodium hydroxide solution can be added to the fixing bath, in which case full fixation is obtained in 5 to 10 minutes at 90°.

EXAMPLE 2

36.3 parts of sodium 1-amino-8-hydroxynaphthalene-3,6-disulfonate are dissolved in 400 parts of warm water and the solution is cooled to 20°. In about 2 hours a solution of 28.5 parts of 2,4-dichloro-6-methylpyrimidine-5-acetic acid chloride in 40 parts of acetone is added dropwise. During the reaction the pH value is maintained between 5 and 6 by adding the necessary amount of 20% sodium carbonate solution. When acylation is complete the product is precipitated with sodium chloride and isolated. It is dissolved in 500 parts of water at 30–40° C., the solution cooled to 0–5° and then combined with the diazo suspension of 15.5 parts of 2-aminobenzene-1-sulfonic acid at a pH value of 7–8. The dye is precipitated with sodium chloride and suctioned off. It is mixed with 6 parts of a phosphate buffer of pH 7.2, dried and ground, on which it is obtained as a red powder which dissolves in water with a red coloration.

Printing example

A printing paste is prepared with 30 parts of the dye of Example 2, 100 parts of urea, 395 parts of water, 450 parts of 3% sodium alginate thickening, 15 parts of calcined sodium carbonate and 10 parts of sodium 1-nitrobenzene-3-sulfonate. This paste is applied to a fabric of viscose staple fiber on a roller printing machine. The print is dried, steamed for 5–10 minutes at about 102°, rinsed well with cold water, soaped at the boil for 10 minutes, rinsed again with water and dried. A brilliant bluish red print with excellent wet fastness and good light fastness is obtained.

EXAMPLE 3

21 parts of sodium 1,3-diaminobenzene-4-sulfonate are dissolved in 300 parts of warm water. The solution is cooled to 20° and a solution of 28.5 parts of 2,4-dichloro-6-methylpyrimidine-5-acetic acid chloride in 40 parts of acetone is dropped in over about 2 hours. During the reaction the amount of 20% sodium carbonate solution necessary to maintain a pH value of 4–5 is added. On completion of acylation the product is precipitated with sodium chloride and isolated. It is dissolved in 400 parts of water at 20–30°, then 27.5 parts of 24% sodium nitrite solution are added thereto and diazotization effected in a period of 20–30 minutes by dropwise addition of this solution to a mixture of 29 parts of 30% hydrochloric acid and 30 parts of ice, a temperature of 0–5° being maintained by the gradual addition of 75 parts of ice. The coupling reaction is initiated by adding 29 parts of 1-(2′,5′-dichlorophenyl)-3-methyl-5-pyrazolone-4′-sulfonic acid to the diazo suspension over 10 minutes at 0–5°. For 1 to 2 hours the pH is kept at 4–5 by adding solid sodium carbonate. Subsequently, the dye is precipitated with sodium chloride and isolated as described in Example 2. It is a yellow powder which dissolves in water with a yellow coloration. Applied to cellulosic fiber textiles by the padding procedure of Example 1, it gives greenish yellow shades which are fast to light and wet treatments.

EXAMPLE 4

61.5 parts of sodium 1-phenyl-3-methyl-4-(2″-hydroxy-3″-aminophenylazo)-5-pyrazolone - 2′,5′,5″ - trisulfonate are dissolved in 500 parts of water at 60°, with the subsequent addition of 100 parts of 16% copper sulfate solution. The combined solution is stirred for 1 hour at 50–55° with gradual addition of 30% sodium hydroxide solution to keep the pH at 5 to 6. It is then cooled to 20° and a solution of 28.5 parts of 2,4-dichloropyrimidine-5-acetic acid chloride in 40 parts of acetone is added dropwise. The pH is maintained at 5–6 by the addition of 20% sodium carbonate solution. When acylation is complete, the dye is salted out, filtered off, washed with sodium chloride solution, mixed with 8 parts of a phosphate buffer of pH 6.8 and dried. It is a dark-coloured powder which dissolves in water to give yellowish brown solutions and dyes cellulosic fibers in yellowish brown shades of good light and wet fastness.

EXAMPLE 5

55.6 parts of the 2:1 cobalt complex compound of sodium 1-(2′-hydroxy-5′ - nitrophenylazo) - 2 - hydroxy - 3 - aminonaphthalene-7,3′-disulfonate are dissolved in 550 parts of water at room temperature. A solution of 28.5 parts of 2,4-dichloropyrimidine-5-acetic acid chloride in 50 parts of benzene is added with good stirring, while the pH is held at 5.5 to 6.0 by adding 30% sodium hydroxide solution. On completion of the reaction, the dye is precipitated with sodium chloride, suctioned off, washed with sodium chloride solution, mixed with 5 parts of a buffer mixture of 50% monosodium and 50% disodium phosphate, and dried. On grinding the dye is obtained as a dark-coloured powder which gives reddish brown dyeings of good light and wet fastness on cellulosic fibers.

The amino dye used in this example can be replaced by 55.5 parts of the 2:1 chromium complex compound or the 2:1 heterogeneous chromium-cobalt complex compound of sodium 1-hydroxy-2-(2'-hydroxy-5'-nitrophenylazo) - 2 - aminonaphthalene-3,6-disulfonate or by 54.1 parts of the 2:1 chromium complex compound of sodium 1-hydroxy-2-(2'-hydroxy-5'-chlorophenylazo) - 8 - aminonaphthalene-3,6-disulfonate; these starting products yield respectively a greenish black, a black and a navy blue dye, each of which has fastness properties equal to that of the aforedescribed dye.

EXAMPLE 6

17.8 parts of sodium 1-amino-4-(4'-aminophenylamino)-anthraquinone-2,3'-disulfonate are dissolved in 500 parts of water at 50°. The solution is cooled to 20° and a solution of 10 parts of 2,4-dichloropyrimidine-5-acetic acid chloride in 25 parts of dioxane is added dropwise with good stirring. The pH is maintained at 6–6.5 by adding 20% sodium carbonate solution. When the free amino group is no longer indicated, the dye is salted out, suctioned off, washed with sodium chloride solution, mixed with 3 parts of a phosphate buffer of pH 7.0, carefully dried and ground. A dark-coloured powder is obtained which dissolves in water with a blue coloration.

Dyeing example 2 parts of the dye obtained in Example 6 are dissolved in 3000 parts of softened water at 40°. 100 parts of a mercerized cotton fabric, previously wetted out, are entered into this bath, after which additions of 80 parts of calcined sodium sulfate and 20 parts of calcined sodium carbonate are made. The bath is raised to 100° in 30 minutes; after 10 minutes a further 80 parts of calcined sodium sulfate are added and after 20 minutes a further 80 parts. On reaching the boil 40 parts of calcined sodium carbonate are added and the bath is held at this temperature for 1 hour. The dyed fabric is then removed, rinsed with water and dried. It is dyed in a greenish blue shade which is fast to light and to wet treatments.

EXAMPLE 7

A solution of 33.5 parts of the sodium salt of copper phthalocyanine-sulfonic acid-disulfonic acid amide-sulfonic acid-(4'-aminophenylamide) in 400 parts of water is acylated according to the method of Example 6. The resulting dye is a dark-coloured powder which can be printed on cellulosic textiles by aforedescribed method to give light- and wet-fast turquoise blue prints.

Here follows a list of further valuable dyes containing a reactive group of Formula I. They are distinguished by the chemical names of the starting dyes that contain no reactive groups; in these names the amino groups that are reacted with a compound of Formula II are italicized.

8  1 - hydroxy-2-phenylazo-6-*amino*naphthalene-3,2'-disulfonic acid 9  1 - hydroxy-2-phenylazo-6-*amino*naphthalene-3,2',4'-trisulfonic acid 10  1 - hydroxy-2-(3'-*amino*phenylazo)-naphthalene-4,6,6'-trisulfonic acid 11  1 - phenyl - 3-methyl-4-(3''-*amino*phenylazo)-5-pyrazolone-2',5',6''-trisulfonic acid 12  1 - (2'-chlorophenyl)-3-methyl-4-(3''-*amino*phenylazo)-5-pyrazolone-5',6''-disulfonic acid 13  2 - (4'-*amino*phenylazo) - naphthalene-4,6,8-trisulfonic acid 14  1 - hydroxy-2-phenylazo-8-*amino*naphthalene-3,5,2'-trisulfonic acid 15  1-hydroxy - 2 - (4'-methylphenylazo)-8-*amino*naphthalene-3,5,2'-trisulfonic acid 16  2 - [4'-(4''-*amino*phenylazo) - phenylazo] - naphthalene-4,6,8-trisulfonic acid 17  Copper complex compound of 1-hydroxy-2-(2'-hydroxyphenylazo) - 8 - *amino*naphthalene-3,6,5'-trisulfonic acid 18  2:1 cobalt complex compound of 1-hydroxy-2-(2'-hydroxy - 5'-nitrophenylazo)-8-*amino*naphthalene-3,6-disulfonic acid 19  2:1 chromium complex compound of 1-hydroxy-2-(2'-carboxyphenylazo) - 6 - *amino*naphthalene-3,5'-disulfonic acid 20  1 - hydroxy-2-(3'-*amino*phenylazo)-8-*amino*naphthalene-3,6,6'-trisulfonic acid 21  1 - amino-4-(3'-*amino*phenylamine)-anthraquinone-2,6,4'-trisulfonic acid 22  Copper phthalocyanine-trisulfonic acid-sulfonic acid-(3'-*amino*phenylamide)

23  1 - amino-2-(4'-*amino*phenylazo)-7-phenylazo-8-hydroxynaphthalene-3,6,4''-trisulfonic acid 24  1 - hydroxy-2-(4'-methoxyphenylazo)-6-*methylamino*naphthalene-3,2'-disulfonic acid 25  1 - (4'-*amino*phenylazo)-2-hydroxynaphthalene-3,6,2'-trisulfonic acid 26  1 - hydroxy - 2-(4'-phenylazo-phenylazo)-6-*amino*naphthalene-3,2',4''-trisulfonic acid 27  1 - amino - 4-(4'-*methylamino*phenylamino)-anthraquinone-2,2'-disulfonic acid 28  2 - (4'-*ethylamino*phenylazo)-naphthalene-3,6,8-trisulfonic acid 29  Copper phthalocyanine-trisulfonic acid-sulfonic acid-(2'-*amino*ethylamide)

30  4 - (4''-*amino*-2''-methylphenylazo)-4'-(1''-hydroxynaphthyl-2''-azo) - 1,1' - diphenyl-2,2',4'',6''-tetrasulfonic acid 31  1 - hydroxy - 2-(4'-methylphenylazo)-8-*amino*naphthalene-3,6-disulfonic acid 32  1-hydroxy-2-(3'-*amino*phenylazo)-naphthalene-3,6,6'-trisulfonic acid 33  1-amino-4-[4'-(4''-*amino*phenyl)-phenylamino]-anthraquinone-2,6,3''-trisulfonic acid 34  1-amino-4-(3'-*amino*-6''-methylphenylamino)-anthraquinone-2,7,4'-trisulfonic acid 35  1-amino-4-[4'-(4''-*amino*-2''-methylphenyl)-3'-methylphenylamino anthraquinone-2,8,5''-trisulfonic acid 36  Nickelphthalocyanine-trisulfonic acid-sulfonic acid-(3'-*amino*phenylamide)

37  Nickelphthalocyanine-sulfonic acid-disulfonic acid amidesulfonic acid-(2'-*amino*-propylamide 38  Nickelphthalocyanine-disulfonic acid-sulfonic acid amide-sulfonic acid-(3'-*amino*-4'-sulfophenylamide)

39  Cobaltphthalocyanine-sulfonic acid-disulfonic acid amidesulfonic acid-(4'-*amino*phenylamide)

40  Copper phthalocyanine-disulfonic acid-sulfonic acid amidesulfonic acid-(3'-*amino*-4'-methylphenylamide)

41  1-hydroxy-2-(3'-acetylamino-phenylazo)-8-*amino*naphthalene-3,6,6'-trisulfonic acid 42  2-(4'-*amino*-2'-acetylamino-phenylazo)-naphthalene-5,7-disulfonic acid 43  1-(naphthyl-2'-)-3-methyl-4-(4''-*amino*phenylazo)-5-pyrazolone-5',7',2''-trisulfonic acid 44  1-(2'-chlorophenyl)-3-methyl-4-[4''-4'''-*amino*phenyl)-phenylazo]-5-pyrazolone-5',2''-disulfonic acid 45  1-(4''-acetylamino-1',1''-stilbenyl-4')-3-methyl-4-(3''''-*amino*phenylazo)-5-pyrazolone-2',2'',6'''-trisulfonic acid 46  1-(2',5'-dichlorophenyl)-3-methyl-4-[4''-(4'''-*amino*-2'''-methylphenyl)-3''-methylphenylazo]-5-pyrazolone-4',6''-disulfonic acid 47  1-(3'-*amino*phenylazo)-2-hydroxynaphthalene-6,6'-disulfonic acid 48  1-(4'-*amino*phenylazo)-2-hydroxynaphthalene-6,8,2'-trisulfonic acid 49  1-(3'-*amino*phenylazo)-2-hydroxynaphthalene-3,6,8,6'-tetrasulfonic acid 50 1-hydroxy-2-(3'-*amino*phenylazo)-naphthalene-4,6'-disulfonic acid
51 1-hydroxy-2-(3'-*amino*phenylazo)-8-chloronaphthalene-3,6,6'-trisulfonic acid
52 1-hydroxy-2-(3'-*amino*phenylazo)-8-(4''-chlorobenzoylamino)naphthalene-3,6,6'-trisulfonic acid
53 1-hydroxy-2-(3'-*amino*phenylazo)-7-propionylaminonaphthalene-3,6'-disulfonic acid
54 1-hydroxy-2-(3'-*amino*-4'-methylphenylazo)-naphthalene-3,6,6'-trisulfonic acid
55 1-hydroxy-2-(4'-*amino*phenylazo)-8-acetylaminonaphthalene-3,5,2'-trisulfonic acid
56 1-[4'-(4''-*amino*phenyl)-phenylazo]-2-hydroxynaphthalene-6,8,2'-trisulfonic acid
57 1-hydroxy-2-[4'-(4''-*amino*-2''-methylphenyl)-3'-methylphenylazo]-naphthalene-3,8,6'-trisulfonic acid
58 1-[4'-(4''-*amino*-2''-methylphenyl)-3'-methylphenylazo]-2-amino-8-hydroxynaphthalene-3,6,6'-trisulfonic acid
59 1-(4'-*amino*naphthyl-1'-azo)-4-(naphthyl-1''-azo)-naphthalene-6,7',5''-trisulfonic acid
60 1-hydroxy-2-phenylazo-8-(3''-*amino*benzoylamino)-naphthalene-3,6,2',4'-tetrasulfonic acid
61 Copper complex compound of 1-hydroxy-2-(2'-hydroxynaphthyl-1'-azo)-6-*amino*-naphthalene-3,4'-disulfonic acid
62 Copper complex compound of 1-hydroxy-2-(1'-hydroxynaphthyl-2'-azo)-8-*amino*naphthalene-3,6,4',6'-tetrasulfonic acid
63 Copper complex compound of 1-(2'-hydroxy-3'-*amino*phenylazo)-2-hydroxynaphthalene-3,6,5'-trisulfonic acid
64 Nickel complex compound of 1-hydroxy-2-(2'-hydroxyphenylazo)-6-*amino*naphthalene-3,3',5'-trisulfonic acid
65 Copper complex compound of 1-hydroxy-2-(2'-hydroxyphenylazo)-8-*amino*naphthalene-3,6,5'-trisulfonic acid
66 Nickel complex compound of 1-hydroxy-2-(2'-hydroxyphenylazo)-8-*amino*naphthalene-3,6,5'-trisulfonic acid
67 Copper complex compound of 1-hydroxy-2-(2'-hydroxy-3'-chlorophenylazo)-8-*amino*naphthalene-3,6,5'-trisulfonic acid
68 Copper complex compound of 1-hydroxy-2-(2'-hydroxyphenylazo)-8-*amino*naphthalene-3,5-disulfonic acid-5'-sulfonic acid amide
69 Copper complex compound of 1-hydroxy-2-(2'-hydroxy-5'-methylsulfonylphenylazo)-8-*amino*naphthalene-3,5-disulfonic acid
70 Copper complex compound of 1-hydroxy-2-(2'-hydroxy-3'-carboxyphenylazo)-8-*amino*-naphthalene-3,6,5'-trisulfonic acid
71 Copper complex compound of 1-hydroxy-2-(2'-hydroxyphenylazo)-8-*amino*-naphthalene-3,5,3',5'-tetrasulfonic acid
72 Copper complex compound of 1-phenyl-3-methyl-4-(2''-hydroxy-3''-*amino*phenylazo)-5-pyrazolone-4',5''-disulfonic acid
73 2:1-chromium complex compound of 1-hydroxy-2-(2'-hydroxy-3'-chlorophenylazo)-6-*amino*naphthalene-3,5'-disulfonic acid
74 2:1-chromium complex compound of 1-(2'-hydroxyphenylazo)-2-hydroxy-8-*amino*naphthalene-5'-sulfonic acid
75 Mixed 2:1-chromium complex compound of 1-hydroxy-2-(2'-hydroxy-3'-chlorophenylazo(6-*amino*naphthalene-3,5'-disulfonic acid and 1-(2'-hydroxy-3'-chlorophenylazo)-2-hydroxy-8-acetylaminonaphthalene-5'-sulfonic acid
76 2:1-cobalt complex compound of 1-hydroxy-2-(2'-hydroxy-5'-chlorophenylazo)-6-*amino*naphthalene-3,3'-disulfonic acid
77 2:1-cobalt complex compound of 1-hydroxy-2-(2'-hydroxy-3'-nitrophenylazo)-6-*amino*naphthalene-3,5'-disulfonic acid
78 2:1-cobalt complex compound of 1-hydroxy-2-(2'-hydroxy-6'-nitronaphthyl-1'-azo)-6-*amino*naphthalene-3,4'-disulfonic acid
79 2:1-chromium complex compound of 1-hydroxy-2-(2'-hydroxy-6'-nitronaphthyl-1'-azo)-6-*amino*naphthalene-3,4'-disulfonic acid
80 Mixed 2:1-chromium complex compound of 1-hydroxy-2-(2'-hydroxy-3'-chlorophenylazo)-6-*amino*naphthalene-3,5'-disulfonic acid and 1-(2'-hydroxy-3'-nitrophenylazo)-2-hydroxy-8-*amino*naphthalene-5'-sulfonic acid
81 2:1-chromium complex compound of 1-hydroxy-2-(2'-hydroxynaphthyl-1'-azo)-6-*amino*naphthalene-3,4'-disulfonic acid
82 2:1-chromium complex compound of 1-hydroxy-2-2'-hydroxyphenylazo)-6-*amino*naphthalene-3-sulfonic acid-5'-sulfonic acid amide
83 1-hydroxy-2-(3'-*amino*phenylazo)-naphthalene-3,6,6'-trisulfonic acid-8-sulfonic acid amide
84 1-hydroxy-2-phenylazo-7-*amino*-naphthalene-3,3'-disulfonic acid
85 1-amino-4-(4'-*amino*phenylamino)-anthraquinone-2,6-disulfonic acid
86 1-amino-2-(4'-nitrophenylazo)-7-(3''-*amino*phenylazo)-8-hydroxynaphthalene-3,6,6''-trisulfonic acid
87 3(4'-*amino*-2'-methylphenylazo)-pyrene-5,8/10-disulfonic acid
88 3-(4'-*amino*-3'-methoxy-6'-methylphenylazo)-pyrene-5,8/10-disulfonic acid
89 2-[4'-(4''-*amino*-2''-methylphenylazo)-2'-methylphenylazo]-naphthalene-3,6,8-trisulfonic acid
90 1-phenyl-3-carboxy-4-(3''-*amino*phenylazo)-5-pyrazolone-4',6''-disulfonic acid
91 1-(4'-*amino*-2'-methylphenylazo)-4-phenylazo-benzene-2,4''-disulfonic acid
92 Copper complex compound of 1-(2'-chloro-6'-methylphenyl)-3-methyl-4-(2''-hydroxy-3''-*amino*phenylazo)-5-pyrazolone-4',5''disulfonic acid
93 Copper complex compound of 1-hydroxy-2-[(2'-hydroxy-5'-phenylazo)-phenylazo]-6-*amino*naphthalene-3,5,2'',5''-tetrasulfonic acid
94 2:1-chromium complex compound of 1-phenyl-3-methyl-4-(2''-hydroxy-3''-*amino*phenylazo)-5-pyrazolone-3',5''-disulfonic acid
95 Copper complex compound of 1-(2',4'-dihydroxy-3'-phenylazo-phenylazo)-2-hydroxy-3-*amino*-benzene-5,2'',4''-trisulfonic acid
96 2:1-chromium complex compound of 1-hydroxy-2-(2'-hydroxyphenylazo)-8-*amino*naphthalene-3,6-disulfonic acid-5'-sulfonic acid methylamide
97 2:1-chromium complex compound of 1-hydroxy-2-(2'-carboxyphenylazo)-8-*amino*naphthalene-3,6-disulfonic acid
98 2:1-cobalt complex compound of 1-(2'-hydroxy-5'-nitrophenylazo)-2-hydroxy-3-*amino*naphthalene-5,7-disulfonic acid
99 2-(1'-hydroxy-6'-*amino*naphthyl-2'-azo)-naphthalene-4,8,3'-trisulfonic acid
100 1-phenyl-3-methyl-4-(6''-*amino*naphthyl-2''-azo)-5-pyrazolone-2',5',4'',8''-tetrasulfonic acid
101 1-(3'-*amino*phenyl)-3-methyl-4-(naphthyl-2''-azo)-5-pyrazolone-4'',6'',8''-trisulfonic acid
102 Copper complex compound of 1-phenyl-3-methyl-4-(1''-hydroxy-6''-*amino*naphthyl-2''-azo)-5-pyrazolone-2',4',4'',8''-tetrasulfonic acid
103 1-hydroxy-2-(6'-*amino*naphthyl-2'-azo)-naphthalene-4,4',8'-trisulfonic acid
104 Copper complex compound of 1-hydroxy-2-(1'-hydroxy-6'-*amino*naphthyl-2'-azo)-naphthalene-3,6,4',8'-tetrasulfonic acid
105 1-amino-2-,4'-*amino*phenylazo)-7-(4''-*amino*phenylazo)-naphthalene-4,6,2''-trisulfonic acid 106  1-(4'-amino-3'-methoxy-6'-methylphenylazo)-4-phenylazonaphthalene-6,2",5"-trisulfonic acid
107  1-hydroxy-2-(2'-methoxy-4'-phenylazo-5'-aminophenylazo)-4-methylbenzene-2",5"-disulfonic acid
108  1-phenyl-3-methyl-4-(3"-amino-4"-phenylazophenylazo)-5-pyrazolone-2',5',2''',5'''-tetrasulfonic acid
109  Copper complex compound of 1-phenyl-3-methyl-4-(2"-hydroxy-4"-phenylazo-5"-amino-phenylazo)-5-pyrazolone-2',5',2''',5'''-tetrasulfonic acid
110  Copper complex compound of 1-hydroxy-2-(2'-hydroxy-4'-phenylazo-5'-amino-phenylazo)-naphthalene-4,7,2''',4'''-tetrasulfonic acid
111  2:1 cobalt complex compound of 1-hydroxy-2-[2',4'-dihydroxy-3'-(3"-aminophenylazo)-phenylazo]-4-chlorobenzene-6,6'-disulfonic acid
112  1-hydroxy-2-[4'-(naphthyl-1"-azo)-naphthyl-1'-azo]-8-aminonaphthalene-3,6,6',4"-tetrasulfonic acid
113  1-hydroxy-2-[4'-(naphthyl-2"-azo)-naphthyl-1'-azo]-8-aminonaphthalene-3,5,5",7"-tetrasulfonic acid
114  Copper complex compound of 1-hydroxy-2-[2'-hydroxy-4'-(naphthyl-2"-azo)-(naphthyl-1'-azo]-8-amino-naphthalene-3,6,4",8"-tetrasulfonic acid
115  4-(1"-hydroxy-naphthyl-2"-azo)-4'-(2'''-methyl-4'''-aminophenylazo)-1,1'-diphenyl-2,2',4"-trisulfonic acid
116  4-(1"-hydroxynaphthyl-2"-azo)-4'-(2'''-methyl-4'''-amino-5'''-methoxyphenylazo)-2,2'-dimethyl-1,1'-diphenyl-5,5',4",6"-tetrasulfonic acid
117  4-(1"-hydroxynaphthyl-2"-azo)-4'-(1'''-hydroxy-8'''-aminonaphthyl-2'''-azo)-2,2'-dimethyl-1,1'-diphenyl-5,4",3''',6"-tetrasulfonic acid
118  1-(3'-aminophenyl)-3-methyl-4-[4"-(phenylazo)-phenylazo]-5-pyrazolone-2",4'''-disulfonic acid
119  1'-(2',5'-dichlorophenyl)-3-carboxy-4-(3"-aminophenylazo)-5-pyrazolone-4',6"-disulfonic acid
120  4-(1"-hydroxynaphthyl-2"-azo)-4'-(1'''-hydroxy-6'''-aminonaphthyl-2'''-azo)-2,2'-dimethyl-1,1'-diphenyl-3",6",8",3'''-tetrasulfonic acid The reactive components that are reacted with the amino dyes of Examples 8 to 120 are:
(A) 2,4-dichloro-6-methylpyrimidine-5-acetic acid chloride: Examples 8, 12, 14, 16–19, 22, 26, 27, 31 to 120,
(B) 2,4-dichloropyrimidine-5-acetic acid chloride: Examples 10, 11, 15, 20, 21, 23–25, 28–30
(C) 2,4-dibromo-6-methylpyrimidine-5-acetic acid bromide: Example 9
(D) 2,4-dibromopyrimidine-5 - acetic acid chloride: Example 13

The cotton dyeings that are obtained with the dyes of Examples 8 to 120 are of the following shade:

| Example No.: | Shade |
| --- | --- |
| 8 | Orange. |
| 9 | Do. |
| 10 | Scarlet. |
| 11 | Yellow. |
| 12 | Do. |
| 13 | Reddish yellow. |
| 14 | Bluish red. |
| 15 | Do. |
| 16 | Orange. |
| 17 | Violet. |
| 18 | Reddish black. |
| 19 | Red-brown. |
| 20 | Bluish red. |
| 21 | Blue. |
| 22 | Turquoise blue. |
| 23 | Dark green. |
| 24 | Scarlet. |
| 25 | Red. |
| 26 | Bluish red. |
| 27 | Blue. |
| 28 | Yellow. |
| 29 | Turquoise blue. |
| 30 | Scarlet. |
| 31 | Bluish red. |
| 32 | Reddish orange. |
| 33 | Blue. |
| 34 | Reddish blue. |
| 35 | Blue. |
| 36 | Greenish turquoise blue. |
| 37 | Do. |
| 38 | Do. |
| 39 | Turquoise blue. |
| 40 | Do. |
| 41 | Bluish red. |
| 42 | Reddish yellow. |
| 43 | Do. |
| 44 | Yellowish orange. |
| 45 | Yellow. |
| 46 | Greenish yellow. |
| 47 | Orange. |
| 48 | Red. |
| 49 | Orange-red. |
| 50 | Do. |
| 51 | Scarlet. |
| 52 | Bluish red. |
| 53 | Yellowish red. |
| 54 | Red. |
| 55 | Bordeaux. |
| 56 | Red. |
| 57 | Red. |
| 58 | Red. |
| 59 | Red-brown. |
| 60 | Red. |
| 61 | Violet-blue. |
| 62 | Violet. |
| 63 | Blue-red. |
| 64 | Red-brown. |
| 65 | Violet. |
| 66 | Reddish violet. |
| 67 | Violet. |
| 68 | Reddish violet. |
| 69 | Do. |
| 70 | Violet. |
| 71 | Reddish violet. |
| 72 | Brown. |
| 73 | Reddish navy blue. |
| 74 | Gray. |
| 75 | Reddish navy blue. |
| 76 | Brownish violet. |
| 77 | Do. |
| 78 | Do. |
| 79 | Navy blue. |
| 80 | Reddish navy blue. |
| 81 | Navy blue. |
| 82 | Reddish navy blue. |
| 83 | Red. |
| 84 | Yellowish red. |
| 85 | Blue. |
| 86 | Black. |
| 87 | Red-orange. |
| 88 | Brownish yellow. |
| 89 | Orange. |
| 90 | Reddish yellow. |
| 91 | Yellow-brown. |
| 92 | Orange-brown. |
| 93 | Bordeaux. |
| 94 | Red-brown. |
| 95 | Brown. |
| 96 | Navy blue. |
| 97 | Do. |
| 98 | Brown. |
| 99 | Orange. |
| 100 | Orange-yellow. |
| 101 | Do. |
| 102 | Red. |
| 103 | Red. |

| Example No.: | Shade |
|---|---|
| 104 | Navy blue. |
| 105 | Dark green. |
| 106 | Red-brown. |
| 107 | Yellow-brown. |
| 108 | Do. |
| 109 | Black. |
| 110 | Bluish black. |
| 111 | Brown. |
| 112 | Blue. |
| 113 | Do. |
| 114 | Navy blue. |
| 115 | Scarlet. |
| 116 | Red. |
| 117 | Bluish red. |
| 118 | Reddish yellow. |
| 119 | Greenish yellow. |
| 120 | Red. |

Formulae of representative dyes of the foregoing examples are as follows:

EXAMPLE 1

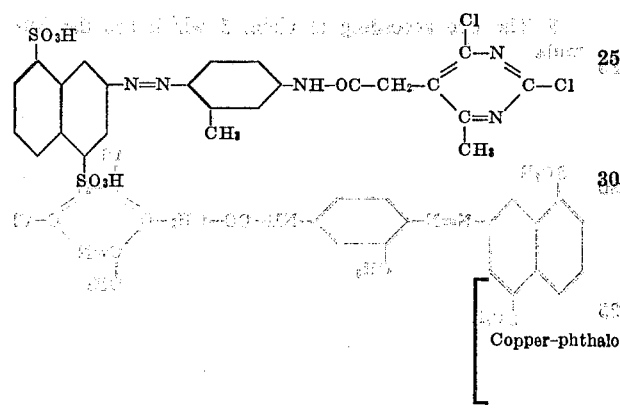

EXAMPLE 2

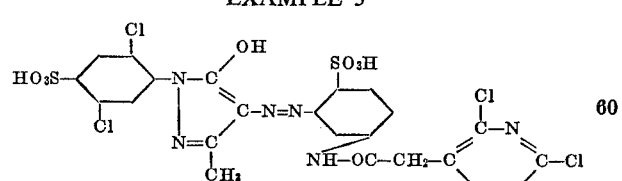

EXAMPLE 3

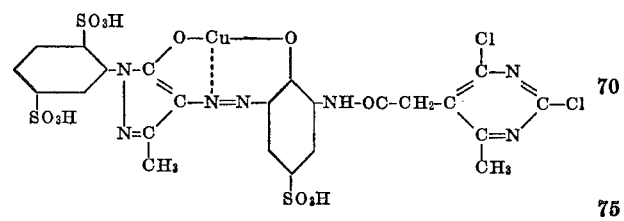

EXAMPLE 4

EXAMPLE 5

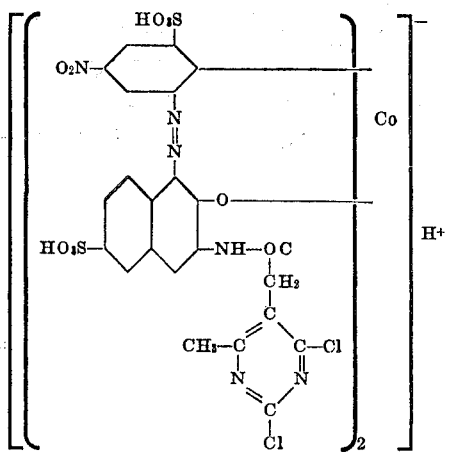

EXAMPLE 6

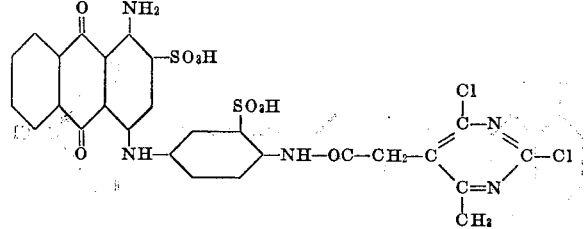

EXAMPLE 7

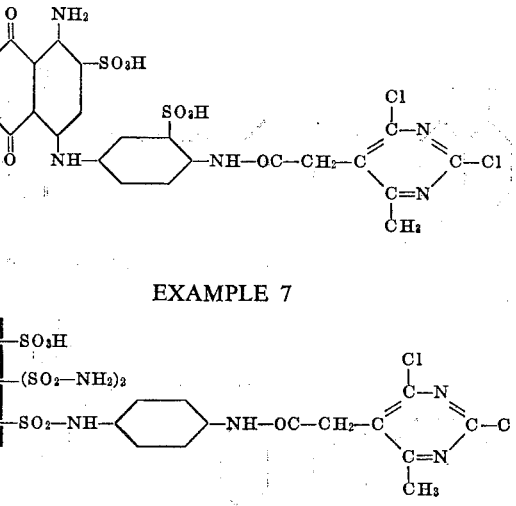

EXAMPLE 8

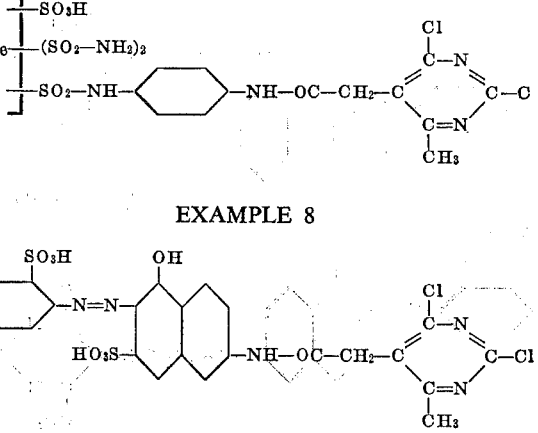

Having thus disclosed the invention what we claim is:
1. Dye of one of the formulae

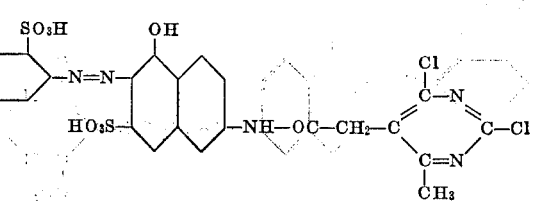

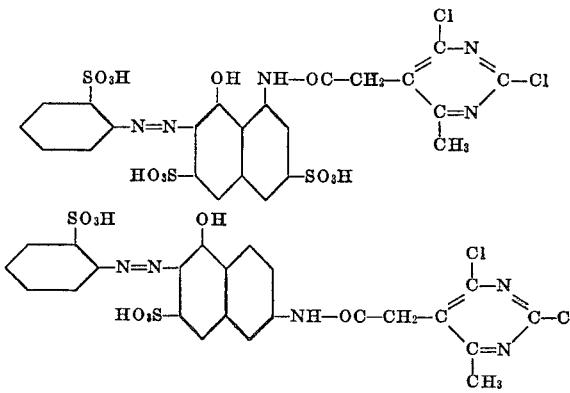

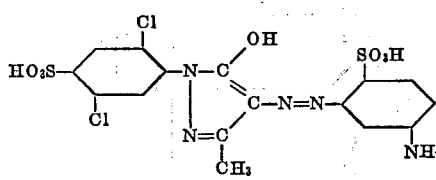
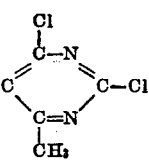
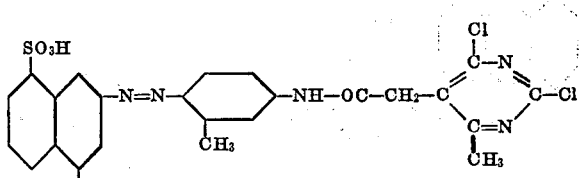
2. The dye according to claim 1 which has the formula
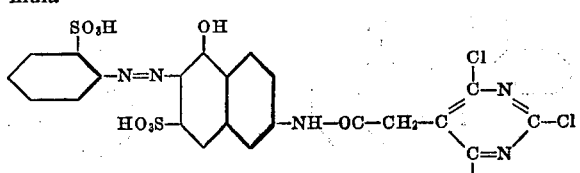
3. The dye according to claim 1 which has the formula
4. The dye according to claim 1 which has the formula
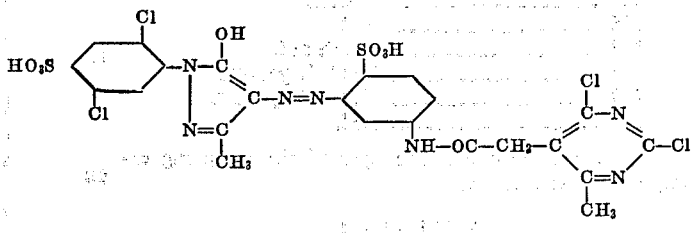
5. The dye according to claim 1 which has the formula
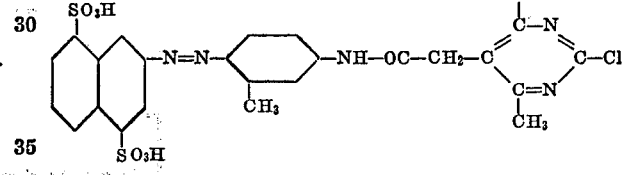
References Cited
UNITED STATES PATENTS
3,336,284  8/1967  Jager et al. -------- 260—154
CHARLES B. PARKER, Primary Examiner
D. M. PAPUGA, Assistant Examiner
U.S. Cl. X.R.
8—41, 51, 54, 54.2, 55; 260—145, 146, 147, 151, 152, 162, 163, 174, 178, 194, 196, 198, 206, 242, 262, 314.5, 370